April 29, 1941.     G. A. LYON     2,239,898
WHEEL STRUCTURE
Filed Nov. 2, 1938     3 Sheets-Sheet 1
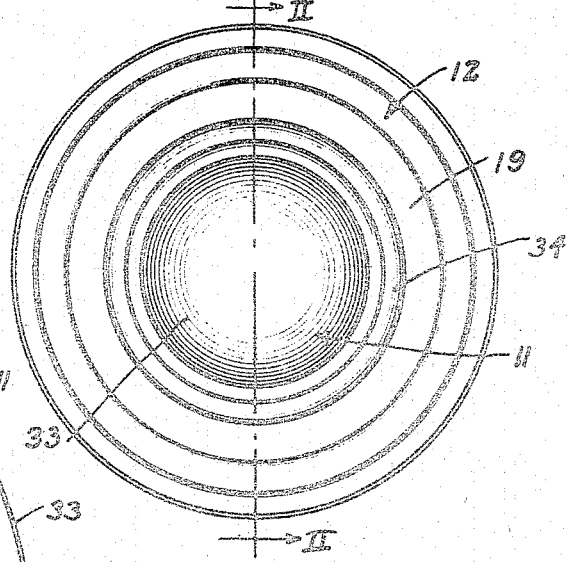
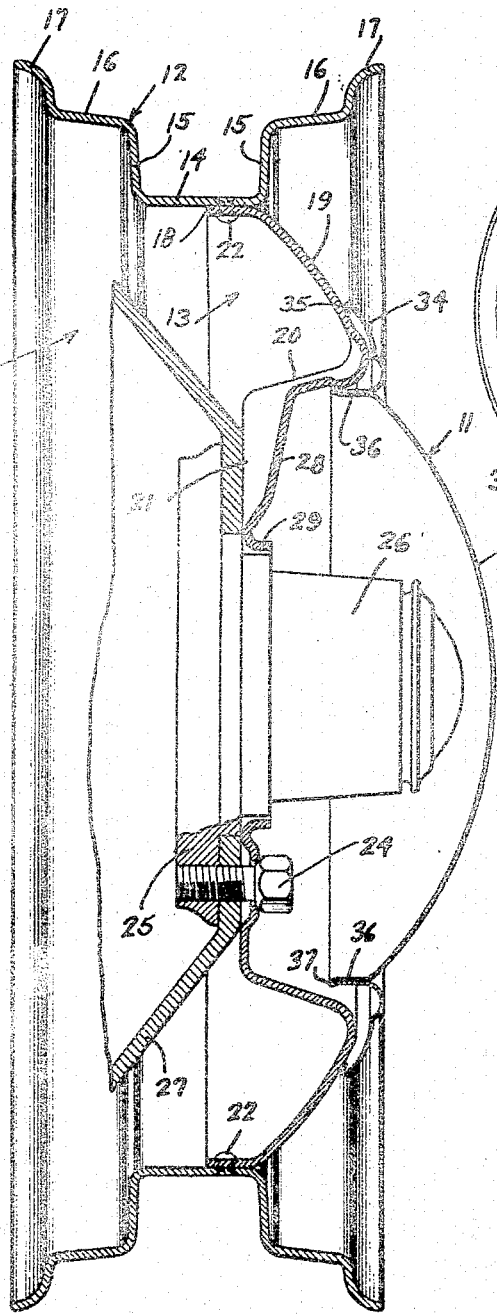
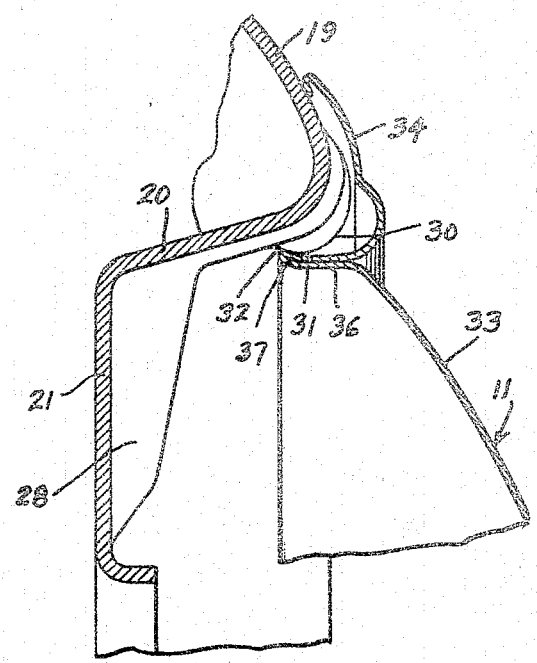
Inventor
GEORGE ALBERT LYON.
by Charles W. Hills
Attys.

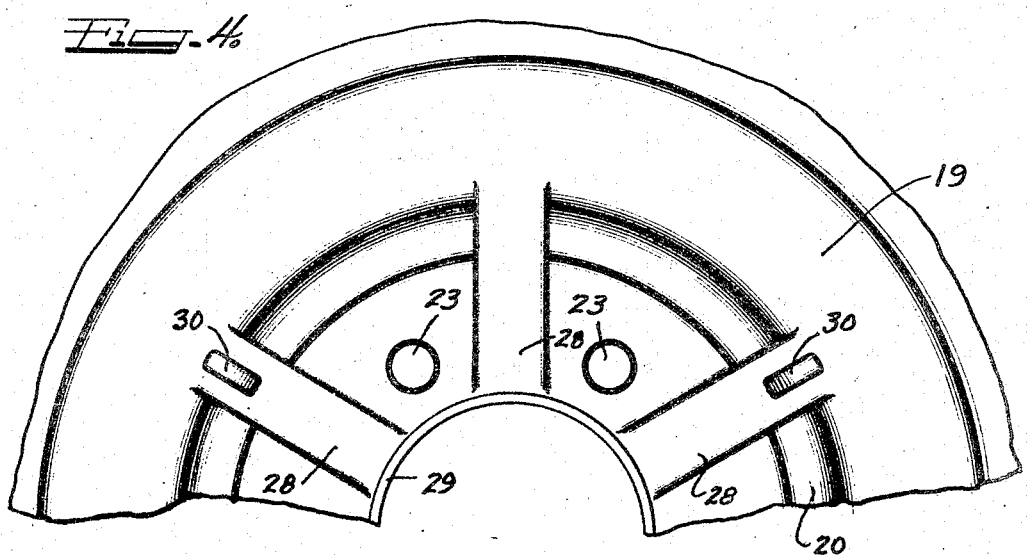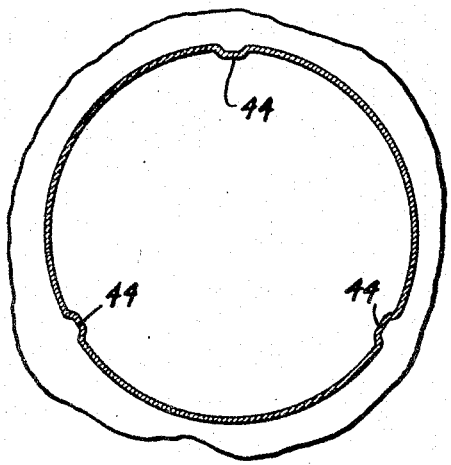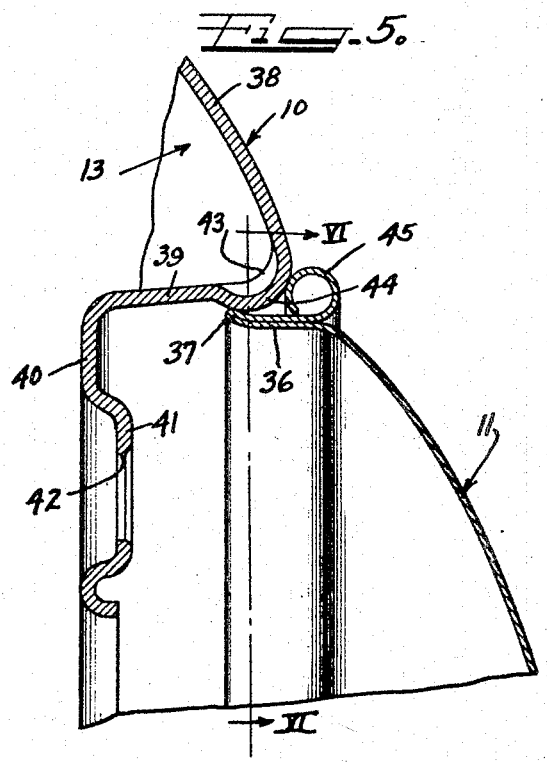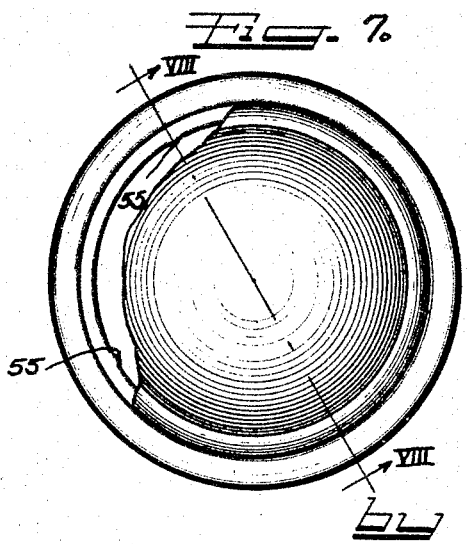

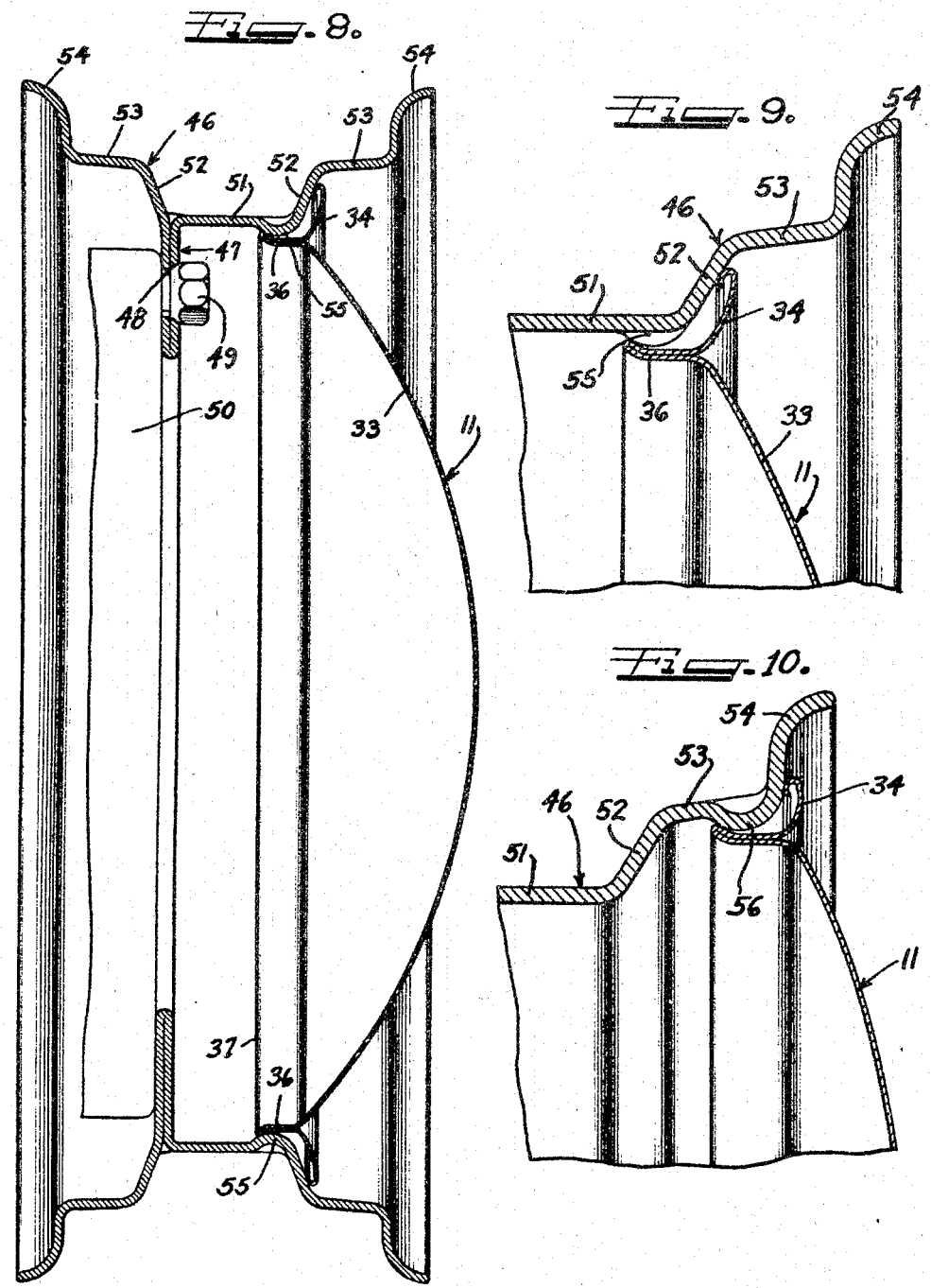

Patented Apr. 29, 1941

2,239,898

UNITED STATES PATENT OFFICE 2,239,898

WHEEL STRUCTURE

George Albert Lyon, Allenhurst, N. J.

Application November 2, 1938, Serial No. 238,299

3 Claims. (Cl. 301—37)

This invention relates to a novel wheel and wheel assembly, and more particularly to a wheel and wheel assembly in which a wheel disk or other member makes a snap-on engagement with the vehicle wheel without the aid of any spring fingers or other usual form of attaching means.

The majority of vehicle wheels today are equipped with ornamental wheel disks over their outer surfaces. The use of these wheel disks permits a more economical manufacture of vehicle wheels, since the wheels themselves may be designed solely for strength and utility without regard to ornamental appearance, the wheel disks being employed for the latter purpose. The most popular form of wheel disk at the present time is a wheel disk having a highly polished exterior surface. The exterior surface of the disk may, of course, be finished in any other suitable manner, such as by enameling it or the like.

In order to minimize the total cost of the wheel assembly, it is of course necessary to minimize the cost of the wheel disk as well as that of the wheel as much as possible. The thinner the sheet metal stock is which is employed to make a wheel disk, the greater the saving in its manufacturing cost. It has been found that a wheel disk may be constructed of a sheet metal stock having a thickness dimension of such a character that a double thickness of the metal, as formed by a tightly folded portion thereof, provides the necessary and desired strength and resiliency in the fastening flange to firmly and securely mount the disk on the wheel.

A further item in the wheel assembly which contributes substantially to the manufacturing cost of the wheel assembly of the type that is commonly known at the present time is the spring finger or attaching element which has previously been employed to detachably secure the wheel disk over the front face of the wheel. It will, of course, be appreciated that the wheel disk must be detachable from the wheel in order to permit access to the wheel-mounting bolts which secure the wheel to the axle-mounting element. The present invention provides a novel form of vehicle wheel which eliminates the need for the usual spring fastening fingers and which permits a wheel disk to be mounted directly thereon. More particularly, the vehicle wheel and the wheel disk are so designed that portions of the wheel disk itself act as attaching means by virtue of the fact that other portions of the wheel disk are capable of being distorted out of their normal shape.

It is an object of the present invention to provide a novel vehicle wheel which is so designed and shaped that a wheel disk may be detachably secured thereon without the need of attaching fingers, bolts, or other similar clamping devices.

Another object of this invention is to provide a novel wheel and wheel disk assembly in which the wheel disk is detachably secured to the wheel in a novel manner.

A further object of this invention is to provide a novel wheel body part having a plurality of radial ribs thereon over which a wheel disk may be sprung to detachably secure the latter thereto.

A still further object of this invention is to provide a novel combination of a wheel disk and a vehicle wheel.

Another and still further object of this invention itself, however, both as to its organization wheel and a wheel disk wherein the wheel disk is provided with an integral tightly folded flange thereon which is arranged to be distorted out of its normally circular position by distorting means on the vehicle wheel thereby tightly and firmly to secure the wheel disk to the wheel.

Another and still further object of the present invention is to provide a novel vehicle wheel having a plurality of raised portions thereon for distorting a normally circular, tightly folded, generally axially rearwardly extending flange on a wheel disk hub cap or other sheet metal wheel member.

The novel features which I believe to be characteristic of my invention are set forth with particularity in the appended claims. My invention itself, however, both as to its organization and manner of construction, together wtih further objects and advantages thereof, may best be understood by reference to the following description taken in connection with the accompanying drawings, in which:

Figure 1 is a front view of a vehicle wheel constructed in accordance with the principles of the present invention and which is equipped with a wheel disk on its outer face;

Figure 2 is an enlarged cross-sectional elevational view taken along the line II—II of Figure 1;

Figure 3 is an enlarged fragmentary sectional view illustrating the manner in which the wheel disk engages the wheel;

Figure 4 is an enlarged partial front view of the wheel with the wheel disk removed;

Figure 5 is an enlarged fragmentary sectional view illustrating a modified form of the present invention wherein a plurality of radially inwardly extending protuberances are provided on an axial portion of the wheel for engagement with the wheel disk;

Figure 6 is a sectional view through the wheel viewed along the line VI—VI in Figure 5;

Figure 7 is a front or face view of a wheel and a wheel disk assembly illustrating a different form of the present invention and wherein the wheel disk is partially broken away to show the configuration of the wheel lying immediately therebehind;

Figure 8 is an enlarged cross-sectional view taken along the line VIII—VIII of Figure 7;

Figure 9 is a greatly enlarged fragmentary view of a portion of the wheel and wheel disk shown in Figures 7 and 8, and as viewed along the line IX—IX of Figure 7; and Figure 10 is an enlarged fragmentary sectional view of a modified form of the wheel and wheel disk assembly shown in Figure 7 wherein the protuberances are formed on the rim rather than on the body part of the wheel.

Referring now to the preferred embodiment of my invention which is illustrated in Figures 1 to 4 of the drawings, there is shown therein a wheel assembly comprising a vehicle wheel 10 and a wheel disk or hub cap member 11. As shown in the drawings, the wheel 10 comprises a rim part 12 and a body part 13. The rim 12 is of the usual drop-center type and includes a base flange 14, opposite intermediate side flanges 15, opposite intermediate base flanges 16, and opposite edge portions 17. The drop-center rim 12 is illustrated as of the type which is commonly employed in the automotive vehicle art of the present day and, as is well known to those skilled in the art, is arranged to receive and accommodate a pneumatic tire (not shown).

The body part 13 of the wheel 10 includes, in general, a rearwardly extending outer flange 18, an outer web portion 19, a generally axially rearwardly and slightly radially inwardly extending flange 20, and a radially inwardly extending wheel mounting flange 21. The rearwardly extending outer flange 18 is secured to the underside of the base flange 14 of the rim 12 in any suitable manner, such as by riveting it as at 22. The mounting flange 21 is provided with an annular series of apertures 23 for the reception of the wheel mounting bolts 24, which extend therethrough into engagement with the radial attaching flange 25 of the hub 26. The mounting bolts 24 may, of course, extend through the brake drum 27 if the latter is also mounted on the wheel fastening flange 25 of the hub 26.

The wheel body part 13 is provided with a plurality of radially extending ribs 28. The ribs 28, which may be pressed, drawn, or otherwise suitably formed in the wheel body part 13, greatly increase the strength of the wheel 10. As is clearly shown in Figure 4 of the drawings, these ribs 28 extend from the outer web portion 19 to the inner edge 29 of the wheel body part 13. While I have shown six of these ribs 28 in the drawing, it will of course be understood that any suitable number may be employed without departing from the spirit and scope of the present invention.

Formed on some or all of the ribs 28 are secondary ribs or fin-like protuberances 30. As will be best understood from an inspection of Figure 3, these secondary ribs or fin-like protuberances 30 extend around the corner provided by the junction of the outer web portion 19 with the generally axially rearwardly extending flange portion 20. As will further be observed from the drawings, the fin-like protuberances 30 provide a generally radially inwardly extending protuberance or hump portion 31 at their lower ends which provides a depressed portion 32 therebehind. As will presently be explained in detail, these secondary ribs or fin-like protuberances provide a means on the vehicle wheel 10 with which the wheel disk 11 can directly engage to detachably retain the latter thereon without the use of springs, bolts or other usual form of fastening device.

The wheel disk 11, as shown in Figures 1 to 3 of the drawings, includes a dome-shaped central portion 33 and an outer annular marginal portion 34. The outer marginal portion 34 is provided with an inturned outer edge, as at 35, which is arranged to rest on the outer face of the wheel 10.

The outer annular portion 34 and the central dome-shaped portion 33 are connected by an integral tightly folded rearwardly extending flange 36, the axial rearward edge of which is slightly outturned as at 37. The outturned portion 37 of the rearwardly extending folded flange 36 is arranged to be forced over the radial inner edge of the secondary ribs or fin-like protuberances 30. The relative dimensions of the folded flange 36, the outturned portion 37 and the fin-like protuberances 30 are so chosen and selected that as the outturned portion 37 of the flange 36 rides over the radial inner end 31 of the secondary ribs or fin-like protuberances 30, the flange 36 is distorted out of its normally circular position. This is by virtue of the fact that the tightly folded flange 36 possesses a certain amount of resiliency which permits some distortion thereof without rupture. The distortion of the folded flange 36 out of its normally circular position, however, sets up strong resilient biasing forces therein tending to pull it back to its normal position. These forces are of such magnitude and character that the wheel disk 11 is very tightly held on the wheel by virtue of the engagement of the outturned portion 37 of the flange 36 with the secondary ribs or fin-like protuberances 30. As may be clearly seen from an inspection of Figure 3, the slightly outturned portion 37 of the folded flange 36 is arranged to extend into the depressed area 32 behind the radial inner extremity 31 of the secondary ribs or fin-like protuberances 30.

While I have shown an arrangement in Figures 1 to 4 of the drawings wherein the axially extending folded flange of the wheel disk passes over a radial inner portion of the fin-like protuberances or secondary ribs on the wheel, it will of course be understood by those skilled in the art that the wheel disk or member may be provided with an axially extending folded flange having a slightly inturned portion which will pass over a radial outer end of the secondary ribs or fin-like protuberances of the wheel, there being a suitable depressed portion behind the radial outer end of the secondary ribs, without departing from the spirit and scope of the present invention. It is also to be understood that the dome-shaped central portion 33 or the outer marginal portion 34 of the wheel disk or ornamental member 11 may be given any suitable configuration which is convenient or ornamental without departing from the spirit and scope of the present invention.

In Figures 5 and 6 of the drawings, I have illustrated a modified form of the present invention wherein the radial ribs 28 of the preferred form are eliminated and wherein a plurality of radially inwardly extending protuberances are employed in the place of the secondary ribs or fin-like protuberances 30 of the preferred embodiment of the invention. Referring now to Figures 5 and 6, wherein only the inner portion of the wheel body part of the vehicle wheel 10 is shown, since the remaining portion is substantially similar to that illustrated in Figure 2, there is shown a web portion 38, a generally axially extending portion 39, and a radially extending mounting flange 40. The mounting flange 40 is preferably provided with raised portions or bosses 41 which are apertured as at 42 for the reception of the usual wheel mounting bolt (not shown in Figures 5 or 6). The point at which the web portion 38 merges into the axially extending portion 39 provides a curved annular shoulder or corner 43. At annularly spaced points around the axially extending portion 39 of the wheel body 13 and in close proximity to the shoulder or corner 43, a plurality of radially inwardly extending protuberances or hump-shaped portions 44 are provided. As is clearly shown in Figure 5, these protuberances 44 extend radially inwardly of the inner surface of the flange 39 and provide a means for engaging and distorting a folded flange 36 of the wheel disk or ornamental member 11. As is shown in Figure 5, the flange 36 of the wheel disk 11 is bent slightly outwardly as at 37 near its axial rearward end. While the outer marginal portion of the wheel disk 11 may be similar to that shown in Figures 2 and 3 of the drawings, I preferably provide a simple bead-like portion 45.

It will be understood by those skilled in the art that the tightly folded axially extending flange 36 of the wheel disk or ornamental member 11 is distorted out of its normally circular shape as the outturned end 37 of the flange 36 rides over the protuberances 44. The manner in which the wheel disk 11 holds itself on the wheel 10 by the inherent resiliency in the tightly folded flange 36 is exactly the same in this case as that described in connection with the preferred embodiment of the invention.

In Figures 7, 8 and 9 of the drawings I have illustrated an embodiment of my invention as applied to a one-piece wheel such as that described in my copending application entitled "Wheel," Serial No. 91,504, filed July 20, 1936. The wheel and wheel disk assembly illustrated in these figures include the usual rim part 46 and a radially extending depending wheel mounting flange 47. The flange 47 is provided with an annular series of apertures 48 through which the usual wheel mounting bolts 49 are adapted to be inserted for engagement with the brake drum 50. The rim part 46 includes a base flange 51, opposite side flanges 52, opposite intermediate flanges 53, and opposite edge portions 54. As may be seen by a close inspection of Figure 8, a radially inwardly extending wheel mounting flange 47 is formed integral with the rim 46 and is formed of a double thickness of metal. The wheel mounting flange 47 may be formed in any suitable or convenient manner, such as by bending or collapsing a portion of the base flange 51 in a die press.

In order to provide suitable means on this type of wheel upon which the ornamental member or wheel disk 11 may be mounted, an annular series of radially inwardly extending protuberances 55 are formed in the base flange 51 of the rim 46. Preferably these protuberances are formed in close proximity to the junction point of the base flange 51 and the outer intermediate side flange 52 (see Figures 7 and 8).

The wheel disk or ornamental member 11 is shown in this form of the invention as extending substantially across the entire outer face of the wheel. With the exception of the relative dimensions, the wheel disk or ornamental member 11 in this form of the invention is substantially similar to that shown in Figure 2 and includes a dome-shaped central portion 33, an outer marginal portion 34, and an integral tightly folded axially extending flange 36 which terminates in a slightly outturned edge 37. The outturned edge 37 of the folded flange 36 is arranged to be sprung over the radially inwardly extending protuberances 55 of the base flange 51, thereby causing the folded flange 36 to be distorted slightly out of its normally circular position. This causes a tight gripping engagement of the outturned edge 37 of the folded flange 36 behind the protuberances 55 on the base flange 51 of the rim 46.

In Figure 10 of the drawings I have illustrated a modified form of the wheel shown in Figures 7 to 9 wherein an annular series of protuberances 56 are formed in the outer intermediate base flange 53 instead of the base flange 51. These protuberances 56 are preferably formed in close proximity to the junction of the outer intermediate base flange 53 and the outer edge portion 54. The wheel disk or ornamental member 11 is substantially similar to that shown in Figures 7, 8 and 9, with the exception that the outer marginal portion 34 is slightly altered in general shape to take into account its different location on the wheel.

While I have shown particular embodiments of my invention, it will of course be understood that I do not wish to be limited thereto, since many modifications may be made, and I therefore contemplate by the appended claims to cover all such modifications as fall within the true spirit and scope of my invention.

I claim as my invention:

1. In a wheel and ornamental member assembly, the combination comprising a wheel having a plurality of radially inwardly extending protuberances on the outer face thereof, and an ornamental member disposed on the outer face of said wheel having radially inner and outer parts joined by an integral axially rearwardly extending normally circular folded flange, the rear edge portion of said flange being of greater diameter than the clearance diameter of said protuberances, said folded flange being telescoped with said wheel past said protuberances and said edge portion of said folded flange engaging behind said protuberances, forcing said folded flange out of its normally circular position, whereby said ornamental member is detachably secured to said wheel.

2. In a wheel and ornamental member assembly, the combination comprising a wheel having a plurality of ribs on the outer face thereof, the radially outer portion of said ribs extending radially inwardly then axially rearwardly and obliquely radially outwardly, and an ornamental member disposed on the outer face of said wheel having an integral axially rearwardly extending normally circular resilient folded flange thereon, the rear edge portion of said flange being continuous and being of greater diameter than the clearance diameter of said ribs, said folded flange being telescoped with said wheel past the radially innermost portions of said ribs and said edge portion of said folded flange engaging the axially inner portions of said ribs and being spaced from the remainder of said wheel, said folded flange being distorted out of its normally circular position against the inherent resiliency thereof, whereby said ornamental member is detachably secured to said wheel.

3. The combination comprising a vehicle wheel and an ornamental sheet metal member disposed on the outer face thereof, said wheel having a plurality of radially extending protruberances thereon disposed in a single circular alignment therearound, and said ornamental member having a concealed resilient wheel attaching flange formed by a fold intermediate and joining central and outer concentric portions of said ornamental member and arranged to be telescoped over said protuberances, the two sides of said fold being in contact and said flange being normally circular when said ornamental member is separated from said wheel but different portions thereof being distorted on opposite sides of its normally circular position when mounted on said wheel over said protuberances.

GEORGE ALBERT LYON.